(12) United States Patent
Chen et al.

(10) Patent No.: US 7,441,744 B2
(45) Date of Patent: Oct. 28, 2008

(54) MOUNTING APPARATUS FOR DISK DRIVE

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 189 days.

(21) Appl. No.: 11/565,659

(22) Filed: Dec. 1, 2006

(65) Prior Publication Data

US 2008/0128579 A1    Jun. 5, 2008

(51) Int. Cl.
*F16M 11/00* (2006.01)

(52) U.S. Cl. .................. 248/694; 248/309.1; 312/332.1; 361/685

(58) Field of Classification Search .............. 312/332.1, 312/223.2; 361/685; 439/928.1; 248/694, 248/544, 229.11, 231.31, 309.1
See application file for complete search history.

(56) References Cited

U.S. PATENT DOCUMENTS

| 6,231,145 | B1 | 5/2001 | Liu | |
|---|---|---|---|---|
| 6,490,153 | B1 * | 12/2002 | Casebolt et al. | 361/685 |
| 6,885,551 | B2 * | 4/2005 | Chen | 361/685 |
| 7,016,190 | B1 * | 3/2006 | Chang | 361/685 |
| 7,072,177 | B2 * | 7/2006 | Peng et al. | 361/685 |
| 2007/0188989 | A1 * | 8/2007 | Paul et al. | 361/685 |
| 2007/0230107 | A1 * | 10/2007 | Hsu et al. | 361/685 |

* cited by examiner

*Primary Examiner*—Ramon O Ramirez
(74) *Attorney, Agent, or Firm*—Wei Te Chung

(57) ABSTRACT

A mounting apparatus includes a bracket (10), a tray (20) for holding a disk drive (40), and an operating member (30). The bracket includes a bottom wall (12) and a pair of parallel side walls (17, 18) bent from the bottom wall. A locking piece (176) protrudes from one of the side walls. The tray is slidably secured on the bottom wall of the bracket. The operating member includes a shaft (32) rotatably secured on the side walls of the bracket and a handle (34) bent from the shaft for engaging with the locking piece of the bracket. The operating member is rotatable to urge the shaft to slide the tray along the bottom wall when the handle is disengaged from the locking piece.

20 Claims, 4 Drawing Sheets

MOUNTING APPARATUS FOR DISK DRIVE

BACKGROUND

1. Technical Field

The present invention relates to mounting apparatuses, and more particularly to a mounting apparatus for a disk drive of a computer or a sever.

2. General Background

In a computer or a server, a disk drive, such as a HDD (hard disk drive), or a CD-ROM (compact disc read-only memory), is usually provided. In order to secure the disk drive to the computer or the server, a mounting apparatus is needed.

For example, a mounting apparatus includes a bracket, a tray for receiving the disk drive, and a securing structure installed on the bracket for securing the tray into the bracket. In assembly, the disk drive is firstly received in the tray. Then the disk drive and the tray are together inserted into the bracket, and secured into the bracket by operating the securing structure. In removal, the securing structure is operated to release the tray from the bracket. The tray and the disk drive are thereby drawn out from the bracket. The disk drive can be thus removed from the tray.

However, in the mounting apparatus described above, the tray must be taken away from the bracket to release the disk drive to replace or maintain the disk drive, which is very inconvenient.

What is needed, therefore, is a mounting apparatus for conveniently replacing or maintaining a disk drive in a computer or a server.

SUMMARY

A mounting apparatus includes a bracket, a tray for holding a disk drive, and an operating member. The bracket includes a bottom wall and a pair of parallel side walls bent from the bottom wall. A locking piece protrudes from one of the side walls. The tray is slidably secured on the bottom wall of the bracket. The operating member includes a shaft rotatably secured on the side walls of the bracket and a handle bent from the shaft for engaging with the locking piece of the bracket. The operating member is rotatable to urge the shaft to slide the tray along the bottom wall when the shaft is disengaged from the locking piece.

Other advantages and novel features will be drawn from the following detailed description of preferred embodiments with attached drawings, in which:

DETAILED DESCRIPTION OF PREFERRED EMBODIMENTS

Figure 1:
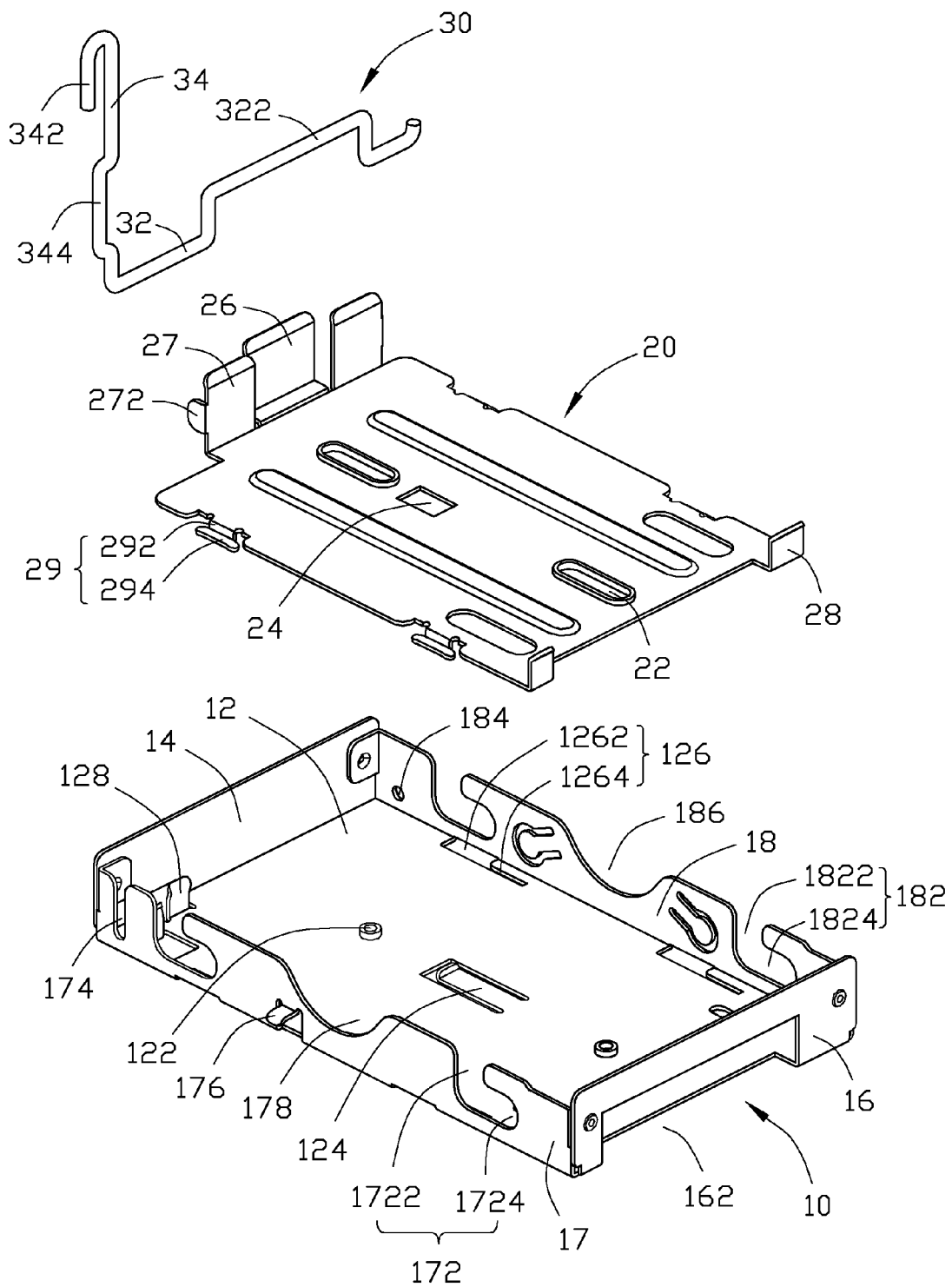
FIG. 1 is an exploded, isometric view of a mounting apparatus of a preferred embodiment of the present invention, the mounting apparatus including a bracket, a sliding plate, and an operating member.
Figure 3:
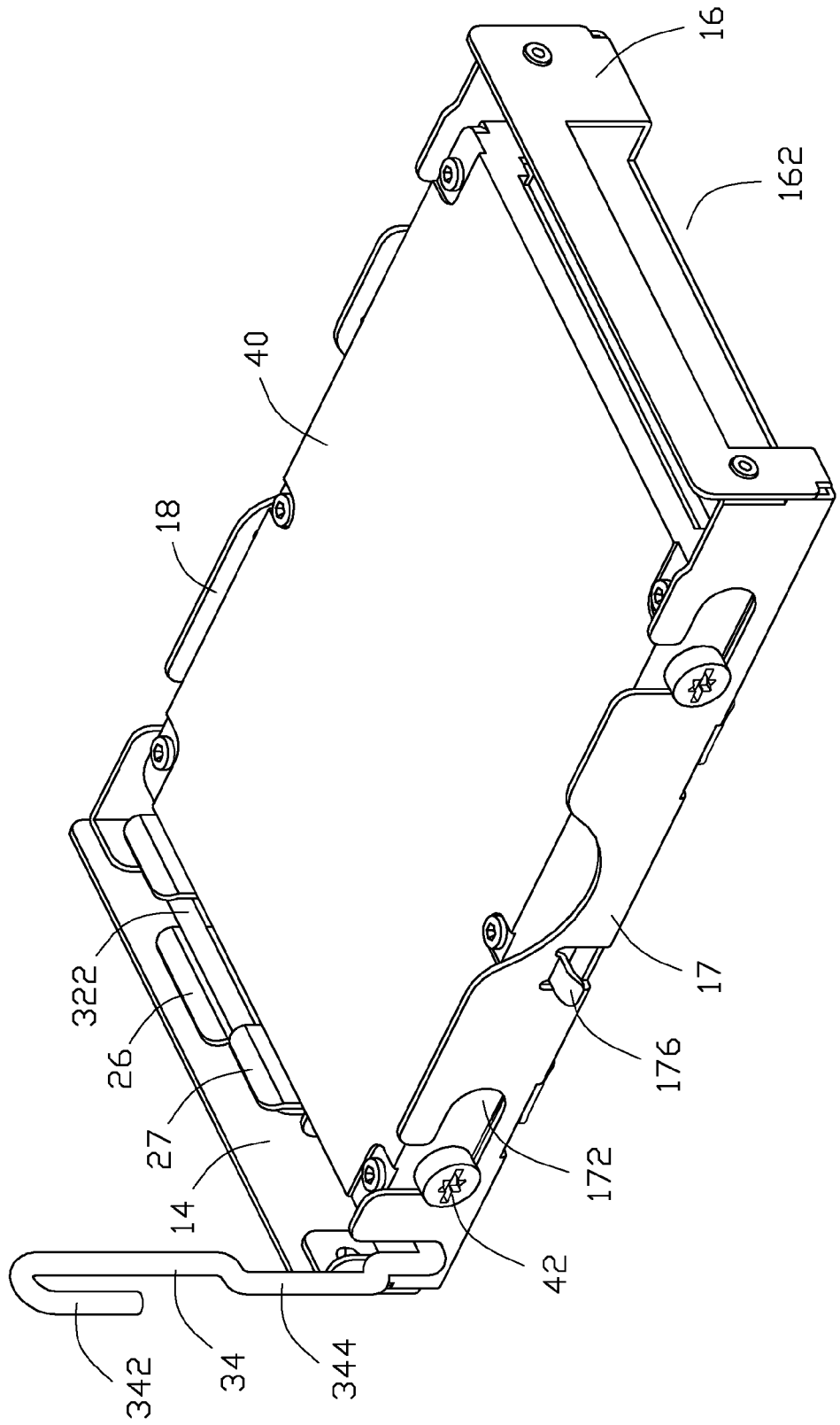
FIG. 3 is an assembled view of a disk drive and the mounting apparatus of FIG. 2, showing the disk drive in a removable position.

Referring to FIGS. 1 and 3, a mounting apparatus of a preferred embodiment of the present invention is configured to install a disk drive 40 of a computer or a server. The disk drive 40 has two side walls each with two screws 42 secured thereon. The mounting apparatus includes a bracket 10, a tray 20, and an operating member 30.

The bracket 10 includes a bottom wall 12, a front wall 14, a rear wall 16 and a pair of parallel side walls 17, 18. The front wall 14, the rear wall 16, and the side walls 17, 18 are perpendicularly bent from edges of the bottom wall 12. The front wall 14 is parallel to the rear wall 16, and perpendicular to the side walls 17, 18. Two guiding posts 122 protrude from the bottom wall 12 in a middle section, and are arranged in a direction perpendicular to the front wall 14. A resilient hook 124 is formed on the bottom wall 12 between the posts 122. Two sliding slots 126 are respectively defined in two side edges of the bottom wall 12, adjacent the side walls 17,18. Each sliding slot 126 is generally L-shaped, and includes a wide portion 1262 and a narrow portion 1264. Two spaced positioning pieces 128 protrude from the bottom wall 12 in a corner adjacent the front wall 14 and the side wall 17. Top portions of the position pieces 128 are bent towards each other. The rear wall 16 defines an opening 162 extending to the bottom wall 12. The side walls 17, 18 define two mounting slots 172, 182, respectively. Each mounting slot 172, 182 is generally L-shaped, and includes a recess 1722, 1822 in a vertical direction and a positioning portion 1724,1824 in a horizontal direction. An elongated cutout 174 is defined in the side wall 17 adjacent the front wall 14. A locking piece 176 extends out from the side wall 17 between the mounting slots 172. An arc-shaped cutout 178 is defined in a top edge of the side wall 17 between the mounting slots 172. The arc-shaped cutout 178 is above the locking piece 176. The side wall 18 defines a through hole 184 adjacent the front wall 14, and an arc-shaped cutout 186 in a top edge thereof between the mounting slots 184.

The tray 20 defines two guiding slots 22 for the guiding posts 122 of the bottom wall 12 of the bracket 10 sliding therein. A locking hole 24 is defined in the tray 20 between the guiding slots 22 for the hook 124 of the bracket 10 slidably engaging therein. A pressing piece 26 and two blocking pieces 27 are bent up from a front edge of the tray 20. The pressing piece 26 is parallel to the blocking pieces 27. A restricting tab 272 is perpendicularly bent from each blocking piece 27, and extends towards the pressing piece 26. Two bent pieces 28 are perpendicularly formed up from two ends of a rear edge of the tray 20. Two sliding pieces 29 are bent down from each side edge of the tray 20, corresponding to the sliding slots 126 of the bottom wall 12 of the bracket 10. Each sliding piece 29 is generally L-shaped, and includes a horizontal portion 292 and a vertical portion 294.

The operating member 30 is made of a wire and includes a shaft 32 and a handle 34 bent from the shaft 32. A generally U-shaped driving portion 322 is bent from the shaft 32. A hook-shaped handle 342 is bent from an end of the handle 34, away from the shaft 32. A protruding portion 344 is formed on the handle 342, adjacent the shaft 32.

Figure 2:
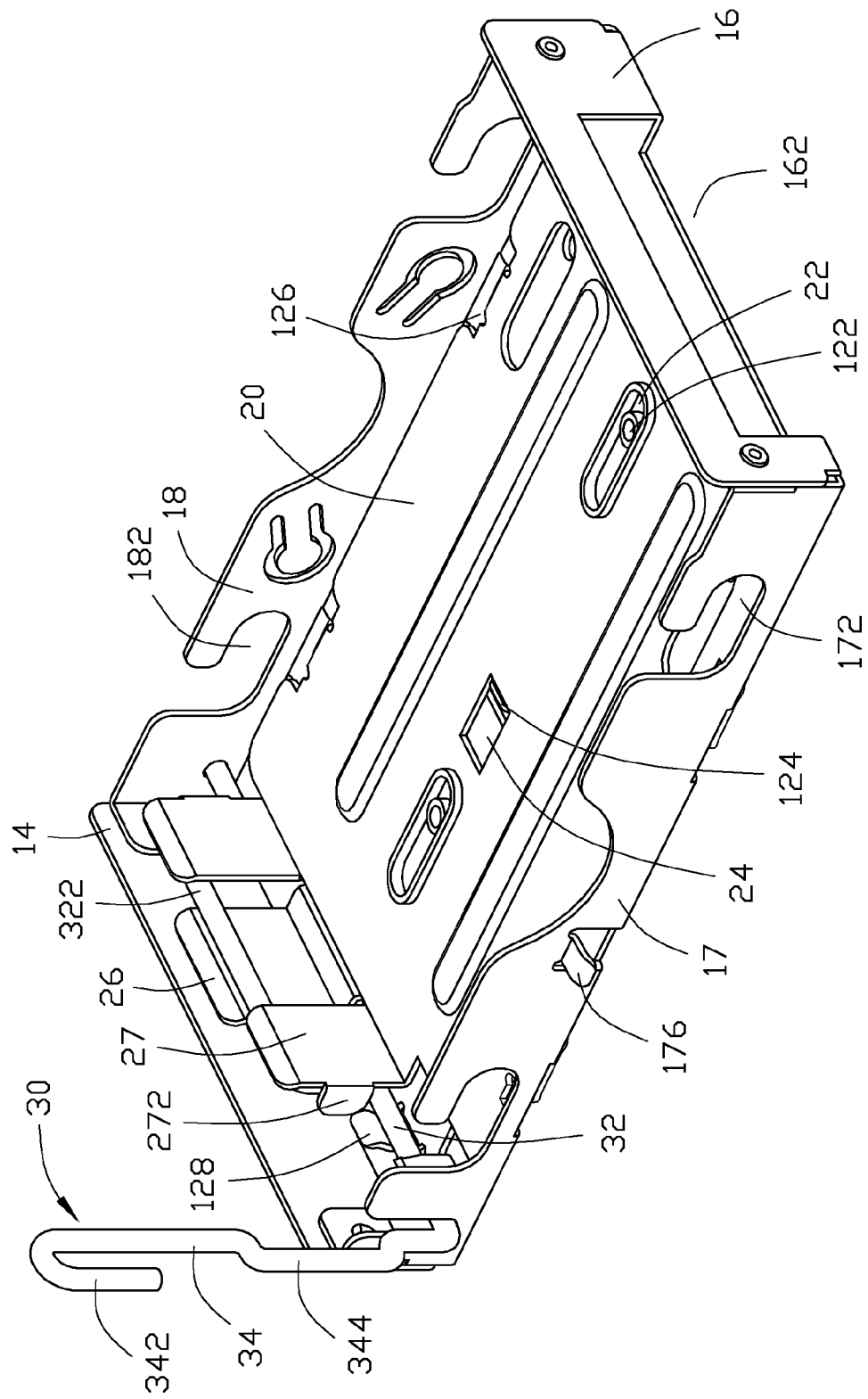
FIG. 2 is an assembled view of FIG. 1.

Referring also to FIG. 2, in assembly of the mounting apparatus, the tray 20 is placed into the bracket 10. The guiding posts 122 of the bottom wall 12 of the bracket 10 are inserted into the corresponding guiding slots 22 of the tray 20. The horizontal portions 294 of the sliding pieces 29 are inserted into the corresponding sliding slots 126 through the wide portions 1262. The resilient hook 124 of the bracket 10 is pressed under the tray 20. The tray 20 is then pushed to slide towards the rear wall 16 of the bracket 10 until the hook 124 extends out of the locking hole 24 of the tray 20 to contact with a rear edge of the locking hole 24. Parts of the vertical portions 292 are slid into the corresponding narrow portions 1264 of the sliding slots 126, and parts of the horizontal portions 294 of the sliding pieces 29 are positioned under the bottom wall 12 of the bracket 10, thereby preventing the sliding pieces 29 moving out of the sliding slots 126 in a direction perpendicular to the bottom wall 12. The hook 124 contacts with the rear edge of the locking hole 24 to block the tray 20 sliding toward the front wall 14 thereby preventing the parts of the vertical portions 292 withdrawing from the narrow portions 1264 of the corresponding sliding slots 126. The tray 20 is thus slidably assembled on the bottom wall 12 of the bracket 10.

The free end of the shaft 32 of the operating member 30 is inserted into the through hole 184 of the side wall 18 of the bracket 10, and the other end of the shaft 32 adjacent to the handle 34 is engaged in the elongated cutout 174 of the side wall 17, and the portion of the shaft 32 between the other end and the driving portion 322 is retained between the two spaced positioning pieces 128 and positioned under the restricting tabs 272 of the blocking pieces 27. The driving portion 322 is positioned between the pressing piece 26 and the blocking pieces 27. The operating member 30 is thus rotatably secured on the side walls 17, 18 of the bracket 10. When the operating member 30 is rotated with the handle 34, the driving portion 322 of the shaft 32 can push against the pressing piece 26 or the blocking pieces 27 to slide the tray 20 along the bottom wall 12 of the bracket 10.

Figure 4:
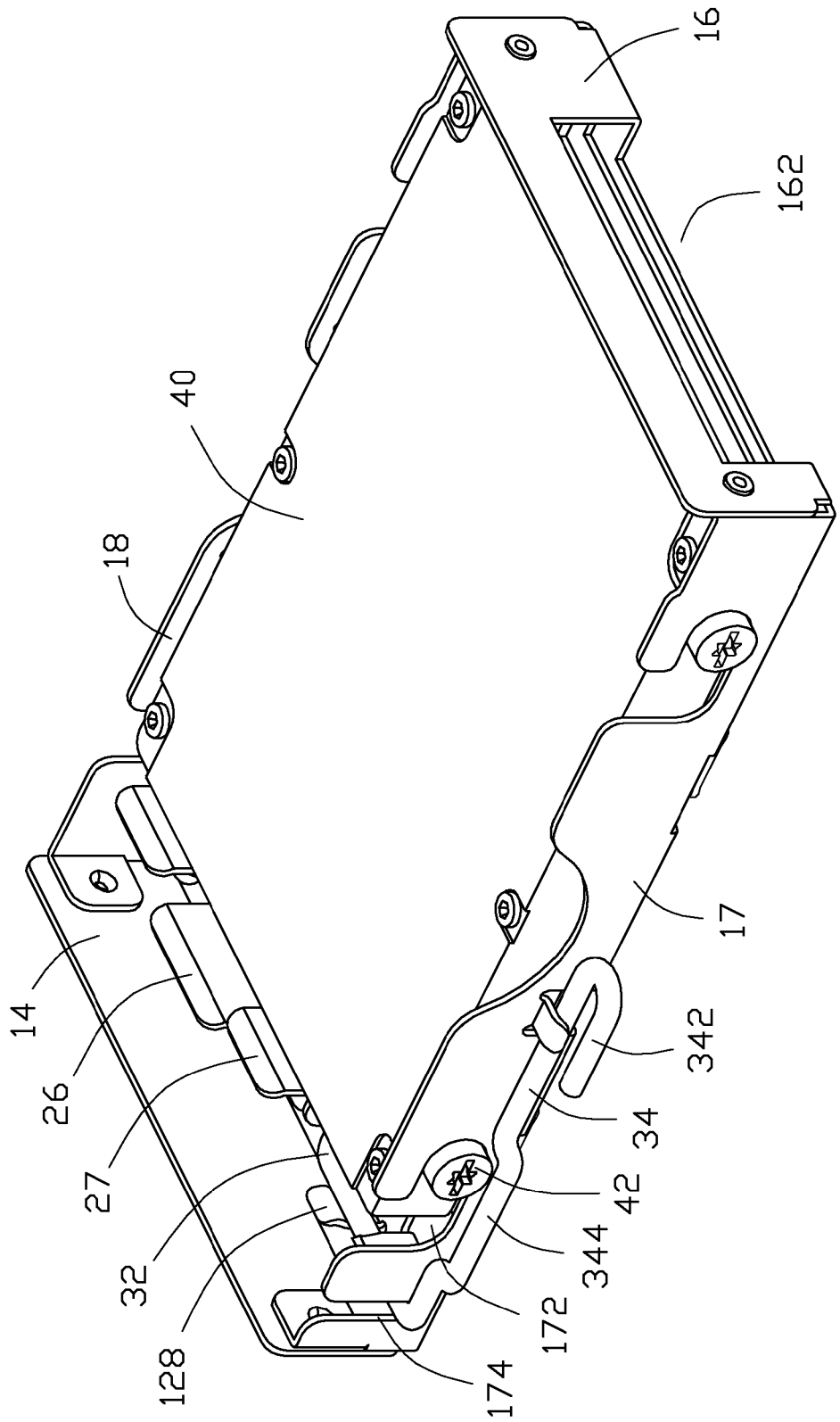
FIG. 4 is another assembled view of FIG. 3, showing the disk drive in a locked position.

Referring also to FIGS. 2 to 4, before the disk drive 40 is placed in the bracket 10, the handle 34 of the operating member 30 is positioned in a vertical position. The tray 20 is positioned in a first position, in which a rear edge of the locking hole 24 of the tray 20 is blocked by the hook 124 of the bracket 10. The disk drive 40 is then placed down on the tray 20 and sandwiched between the blocking pieces 27 and the bent pieces 28. The screws 42 of the disk drive 40 are slid into the corresponding recesses 1722, 1822 of the mounting slots 172, 182 of the bracket 10. The disk drive 40 is positioned in a removable position. The handle 34 of the operating member 30 is then rotated down. The driving portion 322 of the shaft 32 thereby pushes against the blocking pieces 27 to slide the tray 20 towards the rear wall 16. When the screws 42 of the disk drive 40 are blocked by rear edges of the positioning portion 1724, 1824 of the mounting slots 172,182, the disk drive 42 is in a locked position, and the tray 20 is positioned in a second position. The vertical portions 292 of the sliding pieces 29 are slid into the narrow portions 1264 of the corresponding sliding slots 126. The horizontal portions 294 are positioned under the bottom wall 12 of the bracket 10. Then the handle 34 of the operating member 30 is pushed downward to resiliently deform, and thereby passing across the locking piece 176 of the side wall 17. When the handle 34 rebounds and positioned under the locking piece 176, the disk drive 40 is thus secured in the bracket 10.

In removing the disk drive 40, the handle 34 of the operating member 30 is disengaged from the locking piece 176 of the side wall 17 of the bracket 10, and rotated up. The driving portion 322 of the shaft 32 pushes against the pressing piece 26 to slide the tray 20 towards the front wall 14 of the bracket 10. The disk drive 40 slides together with the tray 20. When the screws 42 of the disk drive 40 are positioned in the recesses 1722, 1822 of the corresponding mounting slots 172, 182, the disk drive 40 is in the removable position. The handle 34 of the operating member 30 is in the vertical position. The disk drive 40 can be thus taken away from the tray 20 via a tool or a user's fingers grasping it at the arc-shaped cutouts 178, 186 of the bracket 10 while keeping the tray 20 being mounted on the bracket 20.

In this embodiment, the protruding portion 344 of the handle 34 of the operating member 30 is used to prevent the handle 34 being blocked by the screw 42 of the disk drive 40 during rotation of the handle 34.

In this embodiment, the screws 42 of the disk drive may be other positioning posts. The opening 162 of the bracket 10 is for allowing convenient connection of the disk drive 40 with other electronic elements of the computer or the server.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus comprising:
a bracket comprising a bottom wall and a pair of parallel side walls bent from the bottom wall, a locking piece protruding from one of the side walls;
a tray configured for holding a disk drive thereto being slidably secured on the bottom wall of the bracket; and
an operating member comprising a shaft rotatably secured on the side walls of the bracket and a handle bent from the shaft for engaging with the locking piece of the bracket, the operating member being rotatable to urge the shaft to slide the tray along the bottom wall when the handle is disengaged from the locking piece.

2. The mounting apparatus as described in claim 1, wherein each of the side walls defines at least one mounting slot having a recess in a vertical direction for a screw secured on the disk drive inserting into the mounting slot when the disk drive is in a removable position, and a positioning portion in a horizontal position for blocking the screw of the disk drive when the disk drive is in a locked position.

3. The mounting apparatus as described in claim 1, wherein the bottom wall of the bracket defines a plurality of sliding slots, and a plurality of sliding pieces is bent from the tray for slidably engaging with the sliding slots of the bracket.

4. The mounting apparatus as described in claim 3, wherein each sliding slot of the bracket comprises a wide portion and a narrow portion, each sliding piece of the tray comprising a horizontal portion capable of inserting through the wide portion of the sliding slot, and a vertical portion capable of sliding in the narrow portion.

5. The mounting apparatus as described in claim 3, wherein a resilient hook is formed on the bottom wall of the bracket, the tray defining a locking hole for slidably receiving the hook, an edge of the locking hole engaging with the hook to block the sliding pieces withdrawing from the corresponding sliding slots.

6. The mounting apparatus as described in claim 3, wherein two guiding posts protrude from the bottom wall of the bracket, and the tray defines two guiding slots for the guiding posts sliding therein.

7. The mounting apparatus as described in claim 1, wherein a driving portion protrudes from the shaft of the operating member, a pressing piece and a blocking piece being bent from the tray, the driving portion being positioned between the pressing piece and the blocking piece and configured for pushing the tray to slide when the operating member is rotated.

8. The mounting apparatus as described in claim 7, wherein the driving portion of the operating member is generally U-shaped.

9. The mounting apparatus as described in claim 7, wherein one of the side walls of the bracket defines a through hole therein, the other of the side walls defining an elongated cutout therein, the shaft of the operating member being rotatably secured into the through hole and positioned into the elongated cutout.

10. The mounting apparatus as described in claim 7, wherein one of the pressing piece and the blocking piece of the tray has a restricting tab for restricting the shaft of the operating member thereunder.

11. The mounting apparatus as described in claim 1, wherein each of the side walls of the bracket defines arc-shaped cutout therein for conveniently removing the disk drive from the bracket.

12. A mounting apparatus comprising:
   a bracket;
   a tray for holding a disk drive being slidably secured in the bracket, a pressing piece and a blocking piece being bent from the tray; and
   an operating member rotatably secured on the bracket, the operating member comprising a driving portion which is sandwiched between the pressing piece and the blocking piece, and capable of pushing the pressing piece and the blocking piece to slide the tray relative to the bracket in opposite two directions when the operating member is rotated in another opposite two directions.

13. The mounting apparatus as described in claim 12, wherein the driving portion of the operating member is generally U-shaped.

14. The mounting apparatus as described in claim 12, wherein the bracket defines a plurality of sliding slots therein, and a plurality of sliding pieces is bent from the tray for engaging with the sliding slots of the bracket.

15. The mounting apparatus as described in claim 14, wherein each sliding slot of the bracket comprises a wide portion and a narrow portion, each sliding piece of the tray comprising a horizontal portion capable of inserting through the wide portion of the sliding slot, and a vertical portion capable of sliding in the narrow portion.

16. The mounting apparatus as described in claim 15, wherein a resilient hook is formed on the bottom wall of the bracket, the tray defining a locking hole for receiving the hook to prevent the sliding pieces of the tray releasing from the corresponding sliding slots of the bracket.

17. A mounting apparatus comprising:
   a bracket comprising a bottom wall and a pair of side walls extending from the bottom wall;
   a tray configured for holding thereto a disk drive having at least one slider at each of two opposite sidewalls thereof, the tray being slidably secured on the bottom wall of the bracket, the tray comprising a pair of pieces spaced from each other; and
   an operating member comprising a shaft rotatably mounted to the side walls of the bracket, the shaft comprising a driving portion positioned between the pieces,
   each of the side walls defining at least one mounting slot having a positioning portion configured for retaining a corresponding slider therein and an entrance portion extending slantly from the positioning portion for providing an access to the corresponding slider to enter into the positioning slot, wherein
   when the operating member is rotated in one of clockwise and anti-clockwise direction the driving portion of the shaft drives one of the pieces of the operating member to cause the tray to slide in a first direction which results in the sliders of the disk drive entering into the positioning portions of the corresponding mounting slots and when the operating member is rotated in the other one of clockwise and anti-clockwise direction the driving portion of the shaft drives the other one of the pieces of the operating member to cause the tray to slide in a second direction opposing to the first direction which results in the sliders of the disk drive withdrawing from the positioning portions.

18. The mounting apparatus as claimed in claim 17, wherein the operating member is made of a wire, and the driving portion is offset from the other part of the shaft.

19. The mounting apparatus as claimed in claim 17, wherein the tray comprises at least one sliding piece which comprises an enlarged head portion and a narrow neck portion connected between the head portion and the tray, and the bracket defines at least one sliding slot which comprises a wide portion configured for providing an access to the head portion to enter therethrough and a narrow portion communicating with the wide portion configured for retaining the neck portion therein in a direction perpendicular to the bottom wall.

20. The mounting apparatus as claimed in claim 19, wherein the tray further comprises a bent piece bent therefrom configured for driving the disk drive to slide in the second direction when the operating member is rotated in the other one of clockwise and anti-clockwise direction.

* * * * *